(12) United States Patent
Salhab

(10) Patent No.: US 12,150,189 B2
(45) Date of Patent: Nov. 19, 2024

(54) APPARATUS AND METHOD TO RELAY A TRANSMISSION

(71) Applicant: KING FAHD UNIVERSITY OF PETROLEUM AND MINERALS, Dhahran (SA)

(72) Inventor: Anas M. Salhab, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 274 days.

(21) Appl. No.: 17/972,656

(22) Filed: Oct. 25, 2022

(65) Prior Publication Data

US 2024/0137997 A1 Apr. 25, 2024
US 2024/0237092 A9 Jul. 11, 2024

(51) Int. Cl.
*H04W 76/14* (2018.01)
*H04B 17/336* (2015.01)
*H04W 84/06* (2009.01)

(52) U.S. Cl.
CPC .......... *H04W 76/14* (2018.02); *H04B 17/336* (2015.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2011/0009053 A1* | 1/2011 | Anglin, Jr. | ........... | H04B 7/2606 455/11.1 |
| 2017/0111102 A1 | 4/2017 | Fan et al. | | |
| 2020/0304200 A1* | 9/2020 | Ma | ..................... | H04B 7/18519 |
| 2020/0359297 A1* | 11/2020 | Xu | ...................... | H04W 40/246 |
| 2020/0380872 A1* | 12/2020 | Hong | .................. | G08G 5/0069 |

FOREIGN PATENT DOCUMENTS

| | | | | |
|---|---|---|---|---|
| CN | 108337034 A | 7/2018 | | |
| CN | 113872661 A | 12/2021 | | |
| CN | 111970709 B | * 9/2022 | ............ | G06N 3/006 |

OTHER PUBLICATIONS

Zhan, et al. ; Wireless Relay Communications with Unmanned Aerial Vehicles: Performance and Optimization ; Aug. 19, 2020 ; 32 Pages.

* cited by examiner

*Primary Examiner* — Peter Chen
(74) *Attorney, Agent, or Firm* — Oblon, McClelland, Maier & Neustadt, L.L.P.

(57) ABSTRACT

The disclosure provides a method of relaying a transmission between a source device and a destination device in a wireless communication network where one or more unmanned aerial vehicles (UAVs) in a plurality of UAVs have been activated to relay the transmission between the source device and the destination device. The method includes calculating a sum of SNRs associated with the one or more UAVs and determining whether the sum of the SNRs is less than a predetermined threshold. The method further includes, when the sum of the SNRs is less than the predetermined threshold, determining whether there is at least one UAV in the plurality of UAVs that has not been activated to relay the transmission. Also, the method includes, when there is at least one UAV that has not been activated to relay the transmission, activating one of the at least one UAV to relay the transmission.

14 Claims, 11 Drawing Sheets

APPARATUS AND METHOD TO RELAY A TRANSMISSION

BACKGROUND

Technical Field

The present disclosure is directed to an apparatus and method for performing relaying transmission between a source device and a destination device based on activating one or more unmanned aerial vehicles (UAVs) from amongst a plurality of UAVs.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Unmanned aerial vehicles (UAVs) in wireless communication networks can be used as flying base stations (BSs) or relays to enhance network performance in terms of reliability and capacity. In an example, UAVs can assist in sending a message from a source device to a destination device. Mobility and agility represent the main characteristics of UAVs that make them superior to ground BSs and relays. Further, a UAV network is less expensive than ground BSs in terms of infrastructure due to the dispensing cables and towers required in ground BSs. UAVs allow for quick network establishment and flexible modification of the network configuration and relay location to improve the network performance.

UAVs are widely used in many application areas. In an example, UAVs can be used for establishing a wireless supplementary network to take load off existing networks in crowded hotspots, and for providing communications in emergency, for example, where the terrestrial network collapses and communication is required for relief team activities. UAVs may be used for providing wireless communications for events like sports and outdoor activities. UAVs may also be used to provide wireless communication relaying in areas that are not served by terrestrial network to establish communication between main control center and terminal users. Further, UAVs may also help in gathering data from ground terminals, such as sensors, or in providing communication between members of teams, such as scientific and rescue teams working outdoor in remote areas. Another significant use of UAVs is in providing communication and internet in regions and countries, where establishing a terrestrial network is expensive.

Models for the channel between a UAV and ground nodes were derived in recent studies (See: A. Al-Hourani, S. Kandeepan, and A. Jamalipour, "Modeling air-to-ground path loss for low altitude platforms in urban environments," in Proc. IEEE Global Commun. Conf., Austin, TX, USA, December 2014 (hereinafter referred to as study 1); Q. Feng, E. K. Tameh, A. R. Nix, and J. McGeehan, "WLCp2-06: Modelling the likelihood of Line-of-Sight for Air-to-Ground radio propagation in urban environments," in Proc. IEEE Globecom, San Francisco, CA, USA, November 2006 (hereinafter referred to as study 2); Q. Feng, J. McGeehan, E. K. Tameh, and A. R. Nix, "Path loss models for air-to-ground radio channels in urban environments," in Proc. IEEE 63rd Veh. Technol. Conf., Melbourne, VIC, Australia, May 2006 (hereinafter referred to as study 3); J. Holis and P. Pechac, "Elevation dependent shadowing model for mobile communications via high altitude platforms in built-up areas," IEEE Trans. Antennas Propag., vol. 56, no. 4, pp. 1078-1084, April 2008 (hereinafter referred to as study 4); and D. W. Matolak and R. Sun, "Unmanned aircraft systems: Air-ground channel characterization for future applications," IEEE Veh. Technol. Mag., vol. 10, no. 2, pp. 79-85, June 2015 (hereinafter referred to as study 5)).

In study 1 and study 2, the probability of line-of-sight (LOS) in terms of elevation angle and urban environmental parameters, such as building heights and concentration was derived. In study 3 and study 4, the focus was developing a path loss model for the UAV network air-to-ground (A2G) channel. The studies showed that the UAV altitude plays a significant role in determining the A2G channel characteristics. In study 5, an experimental work was conducted to build a statistical model for the A2G channel, where measurements were taken in suburban environment at different operating frequencies in the C-Band and L-Band ranges. They used the collected data to model the free space path loss and the K-factor of these networks.

The performance of a wireless network with a flying BS was studied in another recent study (See: M. Mozaffari, W. Saad, M. Bennis, and M. Debbah, "Unmanned aerial vehicle with underlaid device-to-device communications: Performance and tradeoffs," IEEE Trans. Wireless Commun., vol. 15, no. 6, June 2016). The existence of interference from device-to-device (D2D) communication was considered in their derivations. The channel between the UAV and ground nodes was modeled using the probability of LOS and probability of NLOS models. The average coverage probability and sum rate were derived in terms of the UAV altitude and the number of D2D devices. Additionally, the scenario of a moving UAV was considered and an optimization of the number of stop points required by the UAV to maximize the coverage probability was provided using the disc coverage problem.

The optimal altitude was derived for the scenario of static single UAV in a study (See: A. Al-Hourani, S. Kandeepan, and S. Lardner, "Optimal LAP altitude for maximum coverage," IEEE Wireless Commun. Lett., vol. 3, no. 6, pp. 569-572, December 2014). The optimal altitude for the case of two UAVs was derived in another study (See: M. Mozaffari, W. Saad, M. Bennis, and M. Debbah, "Drone small cells in the clouds: Design, deployment and performance analysis," in Proc. IEEE Global Commun. Conf. (GLOBECOM), San Diego, CA, USA, December 2014).

A study of the terrestrial cooperative network containing several destinations and relay nodes served by a single UAV as a flying BS was conducted (See: M. M. Azari, F. Rosas, K. C. Chen, and S. Pollin, "Ultra reliable UAV communication using altitude and cooperation diversity," IEEE Trans. Commun., vol. 66, no. 1, January 2018). It was assumed that the A2G channel follows Rician fading model in the derivation of the outage probability and the optimal altitude of the UAV.

Another study on relay networks with a single UAV was conducted, where the outage probability was derived, and a variable rate protocol for a UAV relay that hovers in a circular trajectory with a fixed altitude was proposed. (See: F. Ono, H. Ochiai, and R. Miura, "A wireless relay network based on unmanned aircraft system with rate optimization," IEEE Trans. Wireless Commun., vol. 15, no. 11, November 2016). Optimization of the data rate was achieved to improve the system performance in terms of the outage probability and information rate.

The application of UAV as a relay with the functionality of energy harvesting (EH) was also studied. (See: L. Yang, J. Chen, M. O. Hasna, and H. C. Yang, "Outage performance of UAV-assisted relaying systems with RF energy harvesting," IEEE Commun. Lett., vol. 22, no. 12, December 2018). The UAV was used to connect two nodes on the ground, where the channels were assumed to follow Rician and Shadowed Rician distributions. The outage probability was analytically derived and the effects of the UAV altitude on the outage probability was studied.

In the area of UAV relay networks with multiple UAVs, multiple UAV relays with EH for internet of things applications were considered, where closed-form expressions for the outage probability and BER were derived. (See: B. Ji, Y. Li, B. Zhou, C. Li, K. Song, and H.

Wen, "Performance analysis of UAV relay assisted IoT communication network enhanced with energy harvesting," IEEE Access, vol. 7, March 2019). The UAV that has best second hop signal-to-noise ratio (SNR) is selected to forward a message from a source device to a destination device. Two scenarios of UAVs distributed on an aerial 2-D plane and in a 3-D space were also studied. The interference between UAVs and the mobility of UAVs were considered in achieving the system capacity for the two scenarios.

In related arts, two protocols are mainly used in case of multiple UAVs. The two protocols includes an all-active relaying protocol where all UAVs forward a message from a source device to a destination device, and a best UAV relaying protocol where all the UAVs are flying in the sky, however, only the UAV which has the best channel among all other UAVs forward a message from a source device to a destination device. In both protocols, all UAVs are assumed to be active and flying in the sky all the time to assist in data communication. In some scenarios, some of these UAVs may be sufficient to achieve a required system performance. Accordingly, there is no requirement for all the available UAVs to fly in the sky all the time. If all the available UAVs are always flying, the required power is always at a high level, wasting the UAVs battery life. This makes the whole process of data communication inefficient. Therefore, an energy efficient UAV relaying protocol needs to be developed.

Accordingly, it is one object of the present disclosure to provide an apparatus and method for performing relaying transmission between a source device and a destination device based on activating one or more UAVs from amongst a plurality of UAVs, such that battery life of the UAVs is not wasted and at the same time the required system performance is achieved.

SUMMARY

In an exemplary embodiment, a method of relaying a transmission between a source device and a destination device in a wireless communication network where one or more activated unmanned aerial vehicles (UAVs) in a plurality of UAVs have been activated to relay the transmission between the source device and the destination device is disclosed. The method includes calculating a sum of signal-to-noise ratios (SNRs) associated with the one or more activated UAVs and determining whether the sum of the SNRs associated with the one or more activated UAVs is less than a predetermined threshold. The method further includes, in response to a determination that the sum of the SNRs associated with the one or more activated UAVs is less than the predetermined threshold, determining whether there is at least one UAV in the plurality of UAVs that has not been activated to relay the transmission between the source device and the destination device. The method also includes, in response to a determination that there is at least one UAV in the plurality of UAVs that has not been activated to relay the transmission between the source device and the destination device, activating one of the at least one UAV to relay the between the source device and the destination device.

In another exemplary embodiment, an apparatus is disclosed. The apparatus includes a processing circuit configured to calculate a sum of signal-to-noise ratios (SNRs) associated with one or more activated unmanned aerial vehicles (UAVs) in a plurality of UAVs, the one or more activated UAVs having been activated to relay a transmission between a source device and a destination device, and determine whether the sum of the SNRs associated with the one or more activated UAVs is less than a predetermined threshold. The processing circuit is further configured to, in response to a determination that the sum of the SNRs associated with the one or more activated UAVs is less than the predetermined threshold, determine whether there is at least one UAV in the plurality of UAVs that has not been activated to relay the transmission between the source device and the destination device. Also, the processing circuit is configured to, in response to a determination that there is at least one UAV in the plurality of UAVs that has not been activated to relay the transmission between the source device and the destination device, activate one of the at least one UAV to relay the transmission between the source device and the destination device.

In yet another exemplary embodiment, a non-transitory computer-readable storage medium is disclosed. The non-transitory computer-readable storage medium stores a program executable by at least one processor to perform calculating a sum of signal-to-noise ratios (SNRs) associated with one or more activated unmanned aerial vehicles (UAVs) in a plurality of UAVs, the one or more activated UAVs having been activated to relay a transmission between a source device and a destination device, and determining whether the sum of the SNRs associated with the one or more activated UAVs is less than a predetermined threshold. The at least one processor is further configured to perform, in response to a determination that the sum of the SNRs associated with the one or more activated UAVs is less than the predetermined threshold, determining whether there is at least one UAV in the plurality of UAVs that has not been activated to relay the transmission between the source device and the destination device. Further, the at least one processor is configured to perform, in response to a determination that there is at least one UAV in the plurality of UAVs that has not been activated to relay the transmission between the source device and the destination device, activating one of the at least one UAV to relay the transmission between the source device and the destination device.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
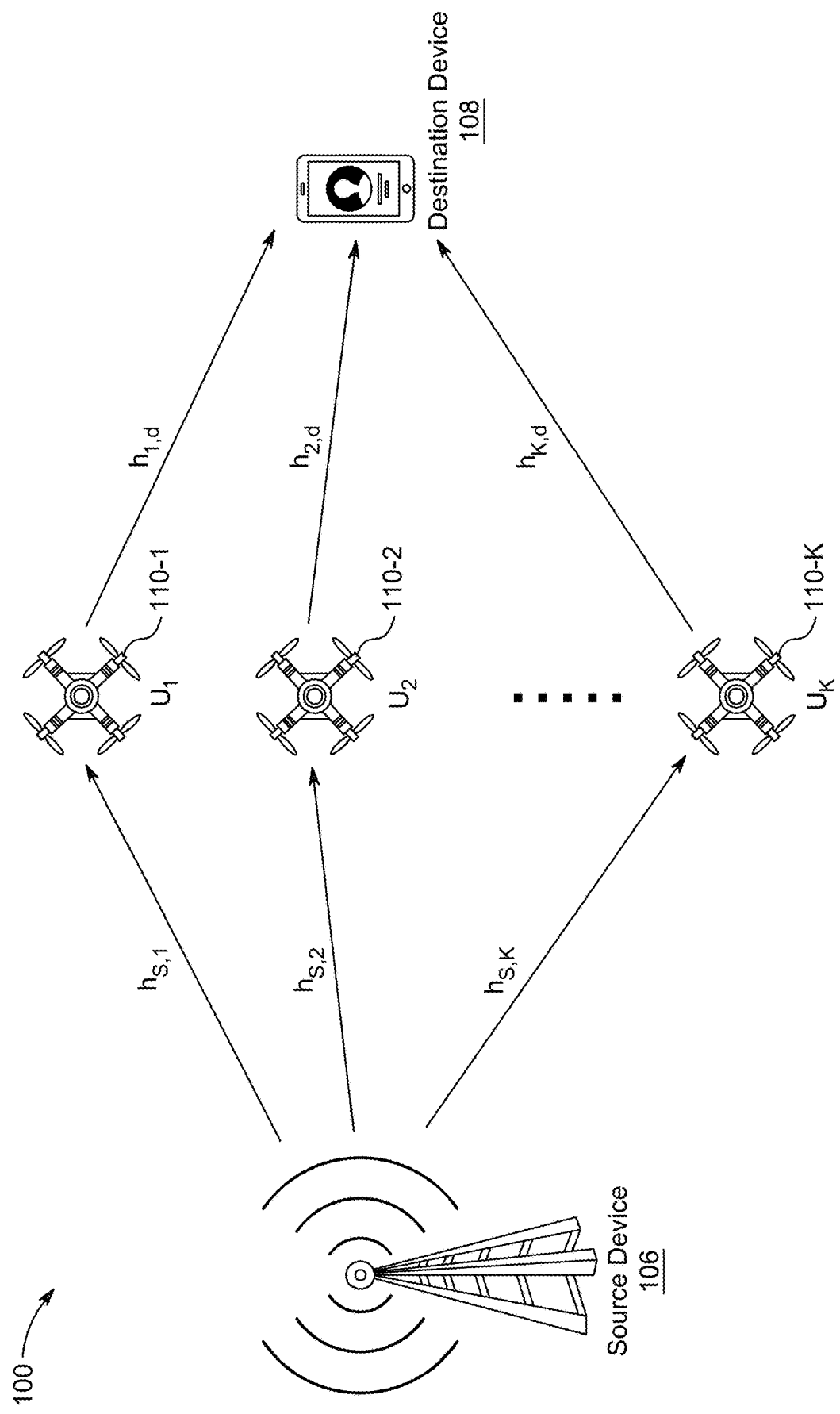
FIG. 1 depicts a multiple-UAV relay network, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to apparatus and method for performing relaying transmission between a source device and a destination device based on activating one or more unmanned aerial vehicles (UAVs) from amongst a plurality of UAVs.

To save the battery life of the UAVs and at the same time to achieve the required system performance, a UAV relaying protocol is disclosed where more UAVs are activated to fly in the sky and assist a source device transmitting a message to a destination device only if the already flying UAVs are not enough to meet (or satisfy) the required system performance.

FIG. 1 depicts a multiple-UAV relay network 100, according to aspects of the present disclosure.

According to an implementation, a system may include a source device 106, a destination device 108, and a plurality of UAVs 110-(1-K). According to an implementation, each of the source device 106, the destination device 108, and the plurality of UAVs 110-(1-K) may be equipped with a respective single antenna. In an implementation, one or more UAVs from amongst the plurality of UAVs 110-(1-K) may be activated to relay a transmission between the source device 106 and the destination device 108.

According to an implementation, the source device 106 may be a ground-based base transceiver station. In an implementation, the destination device 108 may be any device used by a user. In examples, the destination device 108 may be any computing device, such as a mobile device, a desktop computer, a laptop, a tablet computer, a Personal Digital Assistant (PDA), or any other computing device. Without loss of generality, it may be assumed that there is no direct link between the source device 106 and the destination device 108.

In an aspect, the system may operate in two phases (or time slots): a first phase and a second phase. In the first phase, the source device 106 may transmit a source message to each of the one or more activated UAVs from amongst the plurality of UAVs 110-(1-K). In the second phase, each of the one or more activated UAVs may transmit the source message to the destination device 108. In an implementation, the source device 106 may transmit an encoded source message to each of the one or more activated UAVs. Upon receiving the encoded source message, each of the one or more activated UAVs may decode the encoded source message. Further, each of the one or more activated UAVs may transmit the decoded source message to the destination device 108. In an implementation, each of the one or more activated UAVs may utilize a decode-and-forward (DF) relaying protocol to forward or transmit the source message to the destination device 108.

In the example shown in FIG. 1, K UAVs may be used to send a source message from the source device 106 to the destination device 108. Further, $h_{s,i}$ represents the channel coefficient between the source device 106 and the UAV $U_i$, where $i=1, \ldots, K$. Furthermore, $h_{i,d}$ represents the channel coefficient between the UAV $U_i$ and the destination device 108. In an example, the channel coefficients are Rayleigh distributed (i.e., the channels are assumed to follow Rayleigh distribution, where the path loss effect is to be considered in the average value of the channel gain).

Figure 2:
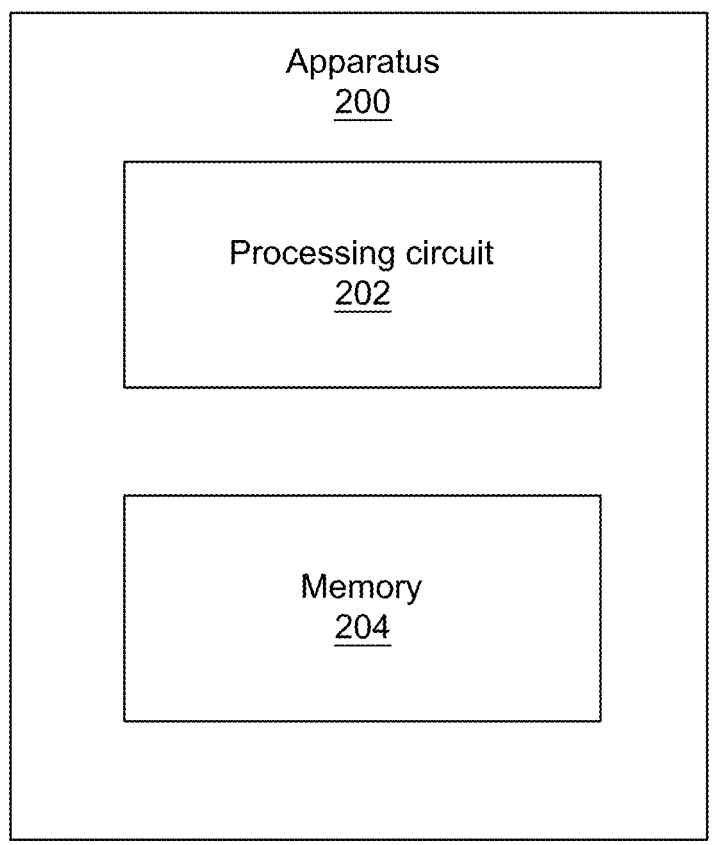
FIG. 2 depicts a block diagram of an apparatus for relaying a transmission between a source device and a destination device based on activating one or more unmanned aerial vehicles (UAVs) from amongst a plurality of UAVs, according to aspects of the present disclosure.

FIG. 2 depicts a block diagram of an apparatus 200 for relaying a transmission between a source device and a destination device based on activating one or more UAVs from amongst a plurality of UAVs, according to aspects of the present disclosure.

In an implementation, the apparatus 200 may be configured to relay a transmission between the source device 106 and the destination device 108 based on activating one or more UAVs from amongst the plurality of UAVs 110-(1-K).

According to an embodiment, the apparatus 200 includes a processing circuit 202 and a memory 204. According to an aspect of the present disclosure, the processing circuit 202 may be implemented as one or more microprocessors, microcomputers, microcontrollers, digital signal processors, central processing units, state machines, logic circuitries, and/or any devices that manipulate signals based on operational instructions. Among other capabilities, processing circuit 202 may be configured to fetch and execute computer-readable instructions stored in the memory 204. The memory 204 may be coupled to the processing circuit 202 and may include any computer-readable medium known in the art including, for example, volatile memory, such as static random access memory (SRAM) and dynamic random access memory (DRAM) and/or nonvolatile memory, such as read only memory (ROM), erasable programmable ROM, flash memories, hard disks, optical disks, and magnetic tapes. The memory 204 may be capable of storing data and allowing any storage location to be directly accessed by the source device 106 and the destination device 108.

In an embodiment, the apparatus 200 may be implemented in the source device 106. In another embodiment, the apparatus 200 may be implemented in the destination device 108. Further, in another embodiment, the apparatus 200 may be implemented in both the source device 106 and the destination device 108. In another embodiment, the apparatus 200 may be implemented in a device that is different from the source device 106 or the destination device 108.

According to an implementation, the processing circuit 102 may be configured to calculate a sum of signal-to-noise ratios (SNRs) associated with the one or more activated UAVs in the plurality of UAVs 110-(1-K). In an implementation, the processing circuit 202 may be configured to calculate a first channel instantaneous SNR and a second channel instantaneous SNR for each of the one or more activated UAVs. In an example, the first channel instantaneous SNR for the respective activated UAV may be associated with a channel between the source device 106 and the respective activated UAV. Further, in an example, the second channel instantaneous SNR for the respective activated UAV may be associated with a channel between the respective activated UAV and the destination device 108. According to an implementation, the processing circuit 202 may be configured to calculate the SNR associated with each of the one or more activated UAVs based on a minimum one between the first channel instantaneous SNR and the second channel instantaneous SNR for the respective activated UAV.

In an implementation, in response to a determination that the sum of the SNRs associated with the one or more activated UAVs is less than the predetermined threshold, the processing circuit 202 may be configured to determine whether there is at least one UAV in the plurality of UAVs 110-(1-K) that has not been activated to relay the transmission between the source device 106 and the destination device 108. Further, in an implementation, in response to a determination that there is at least one UAV in the plurality of UAVs 110-(1-K) that has not been activated to relay the transmission between the source device 106 and the destination device 108, the processing circuit 202 may activate one of the at least one UAV to relay the transmission between the source device 106 and the destination device 108.

Examples by which the first channel SNR and the second channel SNR for each of the one or more activated UAVs are calculated are explained in detail below.

In an implementation, the received message from the source device 106 at the $i^{th}$ UAV may be represented using Equation (1) provided below.

$$y_{s,i} = P_s h_{s,i} x_s + n_i, \quad (1)$$

where, $P_s$ represents the transmission power of the source device 106, $h_{s,i}$ is the channel coefficient between the source device 106 and the UAV $U_i$, $x_s$ represents the data symbol of the source device 106 with $E[|x_s|^2]=1$, where $E[\cdot]$ is the expectation operator, and $n_i$ is the additive white Gaussian noise term at $U_i$ with zero mean and variance $N_0$.

The SNR (i.e., the first channel SNR) at the $i^{th}$ UAV may be mathematically represented using Equation (2) provided below.

$$\gamma_{s,i} = \frac{P_s |h_{s,i}|^2}{N_0}. \quad (2)$$

Given that the channel coefficients are Rayleigh distributed, the channel gains may be exponentially distributed with an average value of $E[|h_{s,i}|^2]=\sigma_{s,i}^2$. The path-loss calculations in dB may be mathematically represented using Equation (3) provided below.

$$L_{AG}(r) = \alpha 10 \log_{10} r + \vartheta \quad (3)$$

where, $\alpha$ represents a free space specific parameter, r represents the distance between the source device 106 and the UAV and equals to $r=\sqrt{h^2+d^2}$, where h and d represents the horizontal and vertical distances, respectively, and $$\vartheta = 10 \log_{10}\left(\frac{4\pi f}{c}\right)^2,$$

where f and c represents the frequency of the wireless signal transmitted through the channel and the light speed, respectively.

The absolute value for the path loss can be mathematically represented using Equation (4) provided below.

$$V(r) = 10^{\frac{L_{AG}(r)}{10}} = \beta r^\alpha, \quad (4)$$

where $\beta=10^{\vartheta/10}$.

The typical values for the free space specific parameters may be mathematically represented using Equation (5) and Equation (6) provided below.

$$\alpha = 2, \quad (5)$$

$$\beta = 10^{\frac{B}{10} + \frac{A}{10+10a' e^{-b'(\theta'-a')}}}, \quad (6)$$

where, $A = \mu_{LOS} - \mu_{NLOS}$, $$B = 10\log_{10}\left(\frac{4\pi f}{c}\right)^2, \text{ and } \theta' = \frac{180}{\pi \arctan\left(\frac{h}{d}\right)}$$

is the angle of elevation. The parameters a', b', $\mu_{LOS}$, and $\mu_{NLOS}$ depend on the propagation environment, which for suburban areas are given by: a'=5.0188, b'=0.3511, $\mu_{LOS}$=0.1 dB, and $\mu_{NLOS}$=21 dB for example.

In an implementation, the received message from the $i^{th}$ UAV at the destination device 108 may be represented using Equation (7) provided below.

$$y_{i,d} = P_i h_{i,d} x_i + n_d, \quad (7)$$

where, $P_i$ represents the transmission power for the $i^{th}$ UAV, $h_{i,d}$ represents the channel coefficient between the UAV $U_i$ and the destination device 108, $x_i$ represents the data symbol of the UAV $U_i$ with $E[|x_i|^2]=1$, and $n_d$ represents the additive white Gaussian noise term at the destination device 108 with zero mean and variance $N_0$.

The SNR (i.e., the second channel SNR) at the destination device 108 may be mathematically represented using Equation (8) provided below.

$$\gamma_{i,d} = \frac{P_i|h_{i,d}|^2}{N_0}. \tag{8}$$

Given that the channel coefficients are Rayleigh distributed, the channel gains may be exponentially distributed with average value of $E[|h_{i,d}|^2]=\sigma_{i,d}^2$.

According to an implementation, in order to derive the outage probability of the system, the processing circuit 202 may derive the cumulative distribution function (CDF) of the end-to-end (e2e) SNR. To simplify the derivations, an upper bound for the composite SNR of each UAV may be used (mathematically represented using Equation (9) provided below).

$$\gamma_{s,i,d} \leq \min(\gamma_{s,i}, \gamma_{i,d}). \tag{9}$$

The processing circuit 202 may obtain the CDF of $\gamma_{s,i,d}$ using Equation (10) provided below.

$$F_{\gamma_{s,i,d}}(\gamma) = F_{\gamma_{s,i}}(\gamma) + F_{\gamma_{i,d}}(\gamma) - F_{\gamma_{s,i}}(\gamma) F_{\gamma_{i,d}}(\gamma), \tag{10}$$

where $F_{\gamma_{s,i}}(\gamma)$ and $F_{\gamma_{i,d}}(\gamma)$ may represent the CDFs of a first hop and a second hop SNRs of the $i^{th}$ UAV, respectively. Further, $F_{\gamma_{s,i}}(\gamma)=1-e^{-\lambda_{s,i}\gamma}$ and $F_{\gamma_{i,d}}(\gamma)=1-e^{-\lambda_{i,d}\gamma}$, where $$\lambda_{s,i} = 1/\bar{\gamma}_{s,i} = \frac{N_0 V(r)}{P_s \sigma_{s,i}^2} \text{ and } \lambda_{i,d} = 1/\bar{\gamma}_{i,d} = \frac{N_0 V(r)}{P_i \sigma_{i,d}^2}.$$

In an implementation, to simplify the derivations, it may be assumed that the first hop and second hop SNRs for each UAV are independent and identically distributed (i.i.d.), i.e., $\bar{\gamma}_{s,i}=\bar{\gamma}_{i,d}=\bar{\gamma}_i$. Accordingly, the CDF of the composite SNR of the UAV may be $F_{\gamma_{s,i,d}}(\gamma)=1-e^{-\lambda_{s,i,d}\gamma}$, where $\lambda_{s,i,d}=1/\bar{\gamma}_{s,i,d}$, with $\bar{\gamma}_{s,i,d}=\bar{\gamma}_i/2$.

According to an implementation, the processing circuit 202 may compute the CDF of the SNR at the destination device 108 using maximum ratio combining (MRC). In an example, the CDF is given by Equation (11) provided below.

$$\begin{aligned} F_{\gamma_D}(\gamma) &= Pr[\gamma_d = \gamma_{s,1,d} + \gamma_{s,2,d} + \ldots + \gamma_{s,K,d} \leq \gamma]; \\ &= Pr\left[\gamma_d = \sum_{i=1}^{K} \gamma_{s,i,d} \leq \gamma\right]; \\ &= \prod_{i=1}^{K} F_{\gamma_{s,i,d}}(\gamma) \end{aligned} \tag{11}$$

where K represents the number of the activated UAVs.

For i.i.d., UAV composite SNRs are identically distributed, i.e., $\bar{\gamma}_{s,1,d}=\bar{\gamma}_{s,2,d}=\ldots=\bar{\gamma}_{s,K,d}=\bar{\gamma}_{s,u,d}=\bar{\gamma}/2$, the CDF defined in Equation (11) simplifies to:

$$F_{\gamma_D}(\gamma) = [F_{\gamma_{s,u,d}}(\gamma)]^K, \tag{12}$$

where $F_{\gamma_{s,u,d}}(\gamma)=1-e^{-\lambda_{s,u,d}\gamma}$, with $\lambda_{s,u,d}=1/\bar{\gamma}_{s,u,d}$.

In an implementation, a number of the activated UAVs to achieve a target outage probability (interchangeably referred to as outage probability) may be determined based on a predetermined SNR outage threshold. In an example, the target outage probability may be defined as the probability that the SNR at the destination device 108 is below the predetermined SNR outage threshold, i.e., $P_{out}=Pr[\gamma_d \leq \gamma_{out}]$, where $\gamma_{out}=2^{2R}-1$, with R as a fixed spectral efficiency threshold.

According to an implementation, the processing circuit 202 may be configured to compute the target outage probability using Equation (13) provided below.

$$P_{out} = 1 - \sum_{j=0}^{K-1} \frac{(\lambda_{s,u,d}\gamma_{out})^j}{j!} e^{-\lambda_{s,u,d}\gamma_{out}}. \tag{13}$$

Figure 3:
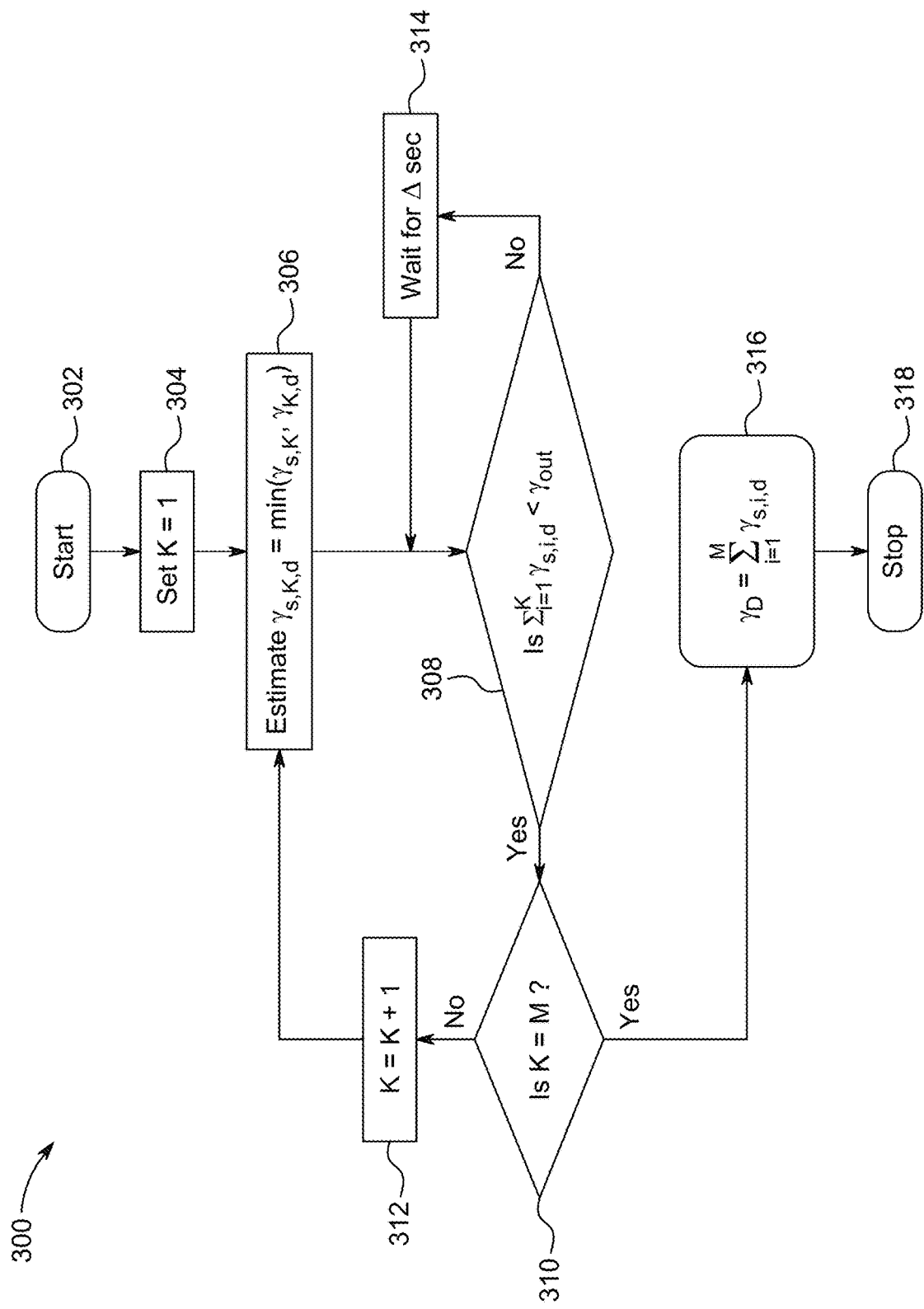
FIG. 3 illustrates a flowchart for a relaying protocol, according to some aspects of the present disclosure.

FIG. 3 illustrates a flowchart 300 for the disclosed relaying protocol, according to some aspects of the present disclosure.

The purpose of the disclosed relaying protocol is to save the battery life and energy of the UAVs. More UAVs may be activated to fly in the sky and help the source device 106 sending a message to the destination device 108 only if the quality of the already flying UAV(s) is below a predetermined quality (e.g., the target SNR outage threshold). The manner in which the disclosed relaying protocol operates is illustrated in the flowchart of FIG. 3, in which a total number of the UAVs is M. In addition, a subset of the UAVs is activated to assist the source device 106 in sending a message to the destination device 108, and a number of the subset of the UAVs is K.

The flowchart 300 commences at start block 302. At step 304, the number of the subset of the UAVs that has been activated is set to one (1) (i.e., K=1). At each transmission time, a UAV is activated to fly and assist the source device 106 in sending a message to the destination device 108. Then, at every new data transmission, which may be a symbol duration ($\Delta$ sec), the processing circuit 202 may estimate the first hop and second hop channels of the activated (flying) UAV.

At step 306, the instantaneous SNRs of the first and second hops of the activated UAV are estimated. In an implementation, the composite channel SNR associated with the activated UAV is calculated using the upper bound as follows, $\gamma_{s,K,d}=\min(\gamma_{s,K},\gamma_{K,d})$. That is, the composite channel SNR associated with the activated UAV is a minimum between the first channel SNR and the second channel SNR for the activated UAV.

At step 308, a sum of the composite channel SNRs $\Sigma_{i=1}^{K} \gamma_{s,i,d}$ associated with the subset of the UAVs that has been activated is compared with the SNR outage threshold gout. If $\Sigma_{i=1}^{K}$ is $\gamma_{s,i,d}$ less than $\gamma_{out}$, then the flowchart 300 moves to Yes branch (step 310). Otherwise, the flowchart 300 moves to No branch (step 314). For example, for K=1, $\Sigma_{i=1}^{K} \gamma_{s,i,d}=\gamma_{s,1,d}$. If $\gamma_{s,1,d}<\gamma_{out}$, a second UVA is activated to fly and assist the source device 106 in sending the message to the destination device 108, and the sum of the SNRs associated with the two flying UAVs is compared with the target outage threshold. If $\gamma_{s,1,d}+\gamma_{s,2,d}<\gamma_{out}$, a third UAV is activated. The process continues until all the available UAVs are activated to fly to forward the message from the source device 106 to the destination device 108.

At step 314, each of the subset of the UAVs that has been activated forwards a decoded version of the source message to the destination device 108, and after a certain period, the flowchart 300 moves to step 308 to compare the SNR sum $\Sigma_{i=1}^{K} \gamma_{s,i,d}$ with the threshold gout again. It is noted that each instantaneous SNR is re-calculated before the comparison is performed.

At step 310, it is determined whether the number of the subset of the UAVs that has been activated is equal to the total number of the UAVs. That is, whether K=M is determined. If it is determined that K≠M, it indicates that at least one of the UAVs has not been activated, and then the flowchart 300 moves to No branch (step 312). If it is determined that K=M, it indicates all UAVs have been activated, and then the flowchart 300 moves to Yes branch (step 316).

At step 312, one of the at least one UAV that has not been activated is activated to fly and assist the source device 106 in sending the message to the destination device 108, so the number of the activated UAVs is K+1. Again, the first hop and second hop channels of the new flying UAV are estimated and the instantaneous SNRs of the first and second hops of that UAV are calculated to find the upper bound of the composite channel SNR.

At step 316, all available UAVs have been activated, and then the flowchart 300 terminates at stop block 318.

It can be seen that by implementing the disclosed relaying protocol, the power and energy of UAVs are saved and not utilized for flying unless the quality of the flying (active) UAV(s) goes below the predetermined quality (target outage threshold). Accordingly, there is no need to activate all the available UAVs to fly if the already flying UAVs are able to satisfy the system requirement. In contrast to the disclosed relaying protocol, in related protocols (for example, all-active relaying protocol and best UAV relaying protocol), all the available UAVs are always flying, and hence, the required flying consumed power is always at a high level, wasting the battery life of the UAVs.

Figure 4:
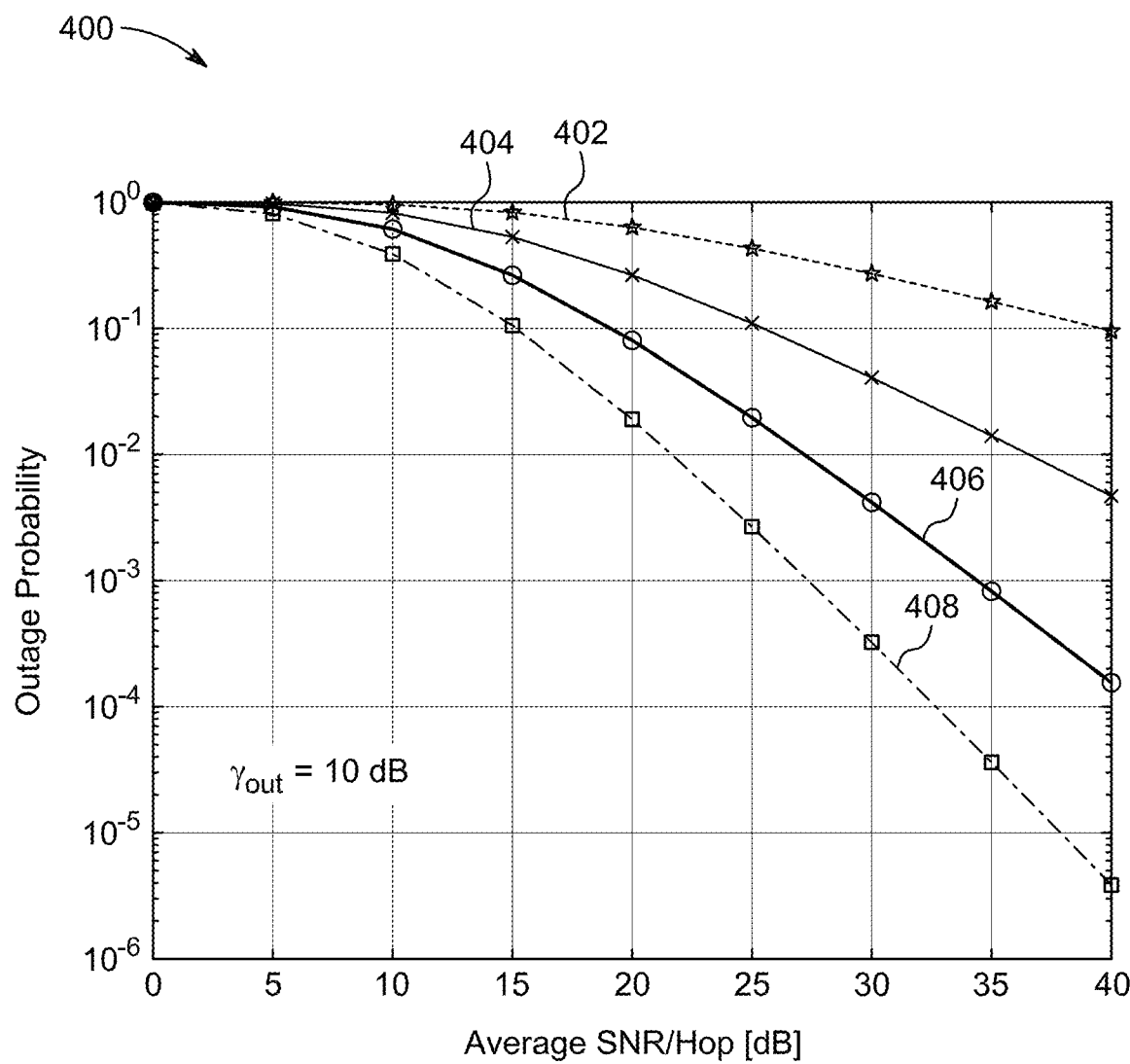
FIG. 4 is a plot illustrating a target outage probability versus an average SNR per hop for different numbers of activated UAVs, according to aspects of the present disclosure.

FIG. 4 is a plot 400 illustrating a target outage probability versus an average SNR per hop for different numbers of activated UAVs, according to aspects of the present disclosure.

In FIG. 4, the predetermined SNR outage threshold $\gamma_{out}$=10 dB, curve 402 represents the target outage probability versus the average SNR per hop for one activated UAV, curve 404 represents the target outage probability versus the average SNR per hop for two activated UAVs, curve 406 represents the target outage probability versus the average SNR per hop for three activated UAVs, and curve 408 represents the target outage probability versus the average SNR per hop for four activated UAVs. It can be seen in FIG. 4, as the number of activated UAVs increases, for the same average SNR per hop, the target outage probability becomes lower, and thus the system performance gets better.

Figure 5:
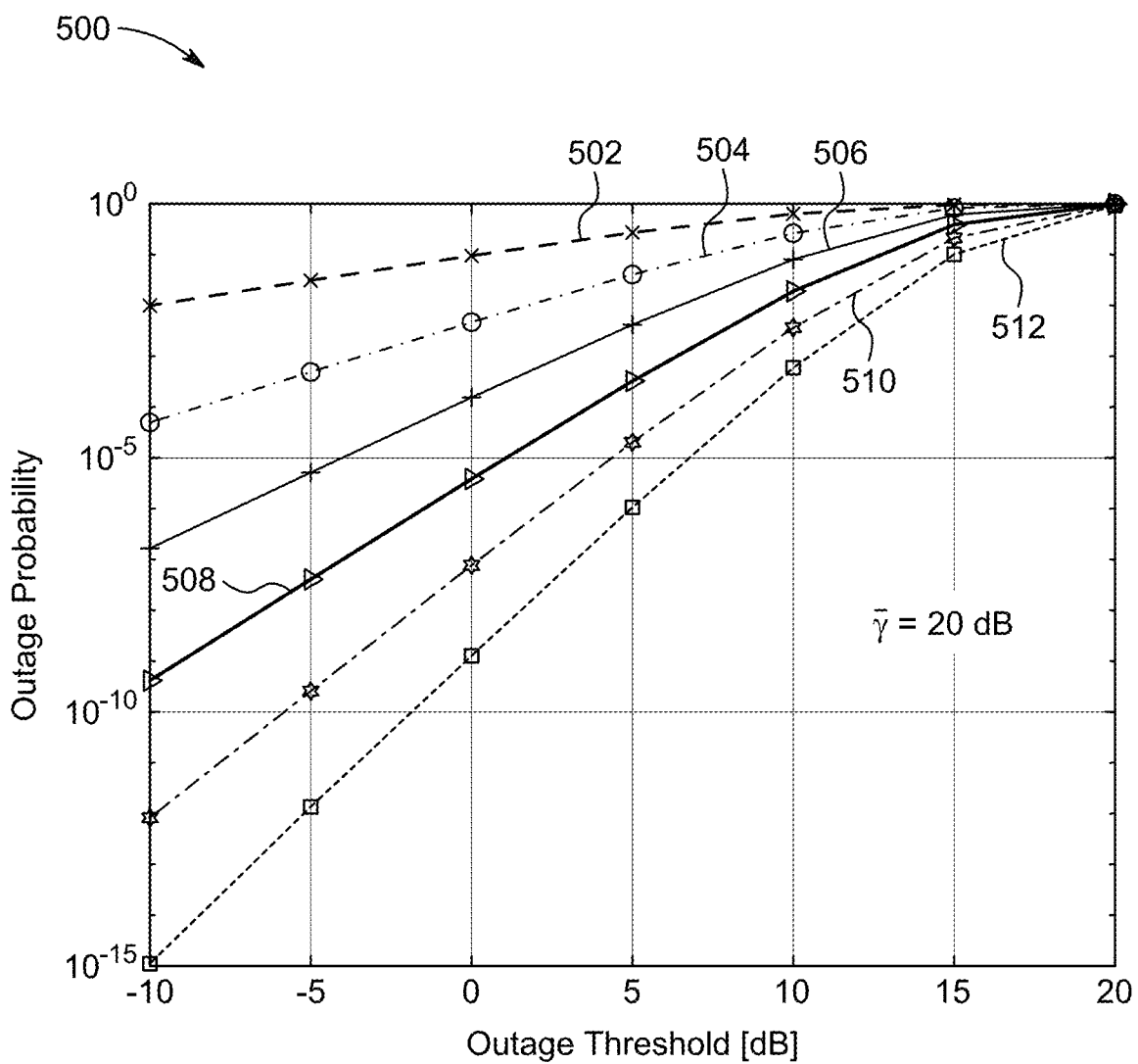
FIG. 5 is a plot illustrating the target outage probability versus an SNR outage threshold for different numbers of activated UAVs, according to aspects of the present disclosure.

FIG. 5 is a plot 500 illustrating a target outage probability versus an SNR outage threshold for different numbers of activated UAVs, according to aspects of the present disclosure. In particular, FIG. 5 illustrates the effect of the number of activated UAVs and the SNR outage threshold on the system performance.

In FIG. 5, $\bar{\gamma}$=20 dB, curve 502 represents the target outage probability versus the SNR outage threshold for one activated UAV, curve 504 represents the target outage probability versus the SNR outage threshold for two activated UAVs, curve 506 represents the target outage probability versus the SNR outage threshold for three activated UAVs, curve 508 represents the target outage probability versus the SNR outage threshold for four activated UAVs, curve 510 represents the target outage probability versus the SNR outage threshold for five activated UAVs, curve 512 represents the target outage probability versus the SNR outage threshold for six activated UAVs.

It can be seen in FIG. 5, as the SNR outage threshold increases, the outage probability increases and the system performance is more deteriorated. Assuming a total number of available UAVs is 6, for a targeted outage probability of $1 \times 10^{-3}$, when the SNR outage threshold is −10 dB, the minimum number of activated UAVs is 2, whereas according to the related studies such as the all-active relaying protocol and the best UAV relaying protocol, all the available UAVs (6) needs to be activated to fly in the sky. As a result, battery life of the UAVs is wasted, especially if the remaining flying UAVs (4) are not being utilized in other parts of the network.

Table 1 (provided below) illustrates the effectiveness of the disclosed relaying protocol in saving the power and energy of the UAVs in achieving a target outage probability.

TABLE 1

Required number of active UAVs to achieve a target outage probability of $1 \times 10^{-3}$ for six available UAVs

| | SNR Outage Threshold $\gamma_{out}$ [dB] | | | | | |
|---|---|---|---|---|---|---|
| | −10 | −5 | 0 | 5 | 10 | 15 |
| Disclosed relaying protocol | 2 | 2 | 3 | 4 | 5 | 6 |
| all-active relaying protocol | 6 | 6 | 6 | 6 | 6 | 6 |
| the best UAV relaying protocol | 6 | 6 | 6 | 6 | 6 | 6 |

As shown in Table 1, when six UAVs are available to be activated, in order to achieve an outage probability of $1 \times 10^{-3}$ at the SNR outage threshold of −10 dB, only 2 UAVs are needed to fly by using the protocol disclosed in the disclosure, whereas according to the all-active relaying protocol and the best UAV relaying protocol presented in related studies, 6 UAVs are needed to fly all the time. In addition, to achieve the same value of the outage probability at the SNR outage threshold of −5 dB, 2 UAVs are needed by using the disclosed relaying protocol. As the SNR outage threshold is increased, more UAVs are required to get the outage probability of $1 \times 10^{-3}$ until the SNR outage threshold $\gamma_{out} \geq 15$ dB where all the available UAVs (6) are required to fly.

Figure 6:
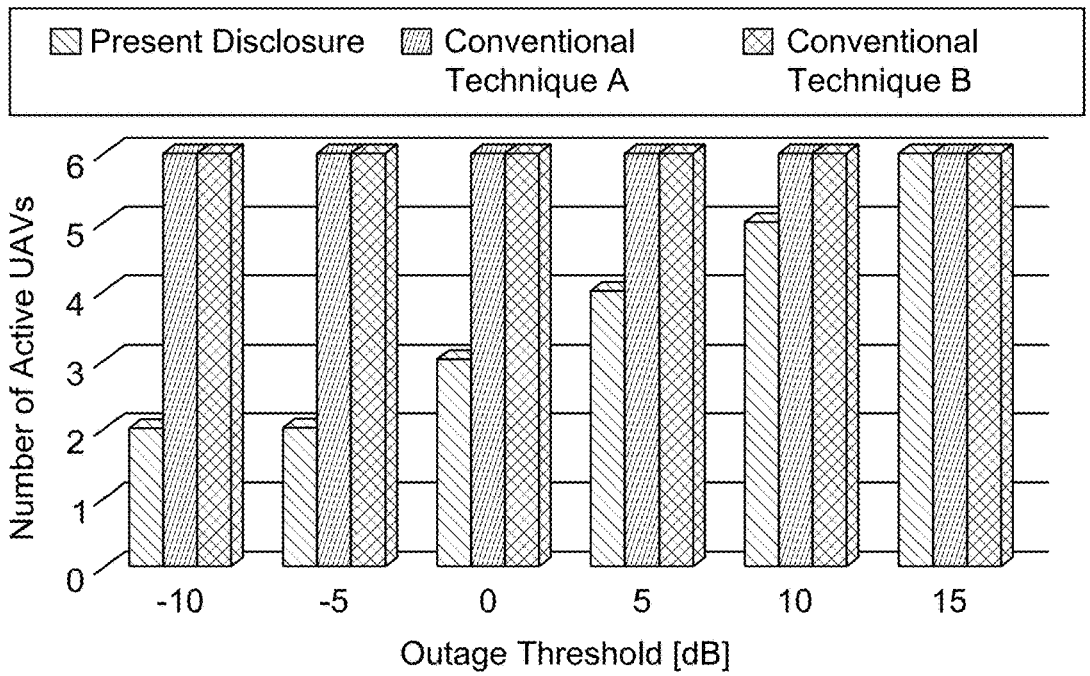
FIG. 6 is a graphical plot illustrating a comparison between the disclosed relaying protocol, the all-active protocol (conventional study A), and the best UAV protocol (conventional study B) for an outage probability of $1 \times 10^{-3}$ and six available UAVs, according to aspects of the present disclosure.

FIG. 6 is a graphical plot 600 illustrating a comparison between the disclosed relaying protocol, the all-active protocol (conventional study A), and the best UAV protocol (conventional study B) for the outage probability of $1 \times 10^{-3}$ and six available UAVs.

As can be seen from FIG. 6, as the SNR outage threshold is increased, more UAVs are required to be activated by using the disclosed relaying protocol to achieve the target outage probability. The increase in the number of active UAVs continues until all the available UAVs are activated to fly to help the source device 106 in sending its message to the destination device 108.

Figure 7:
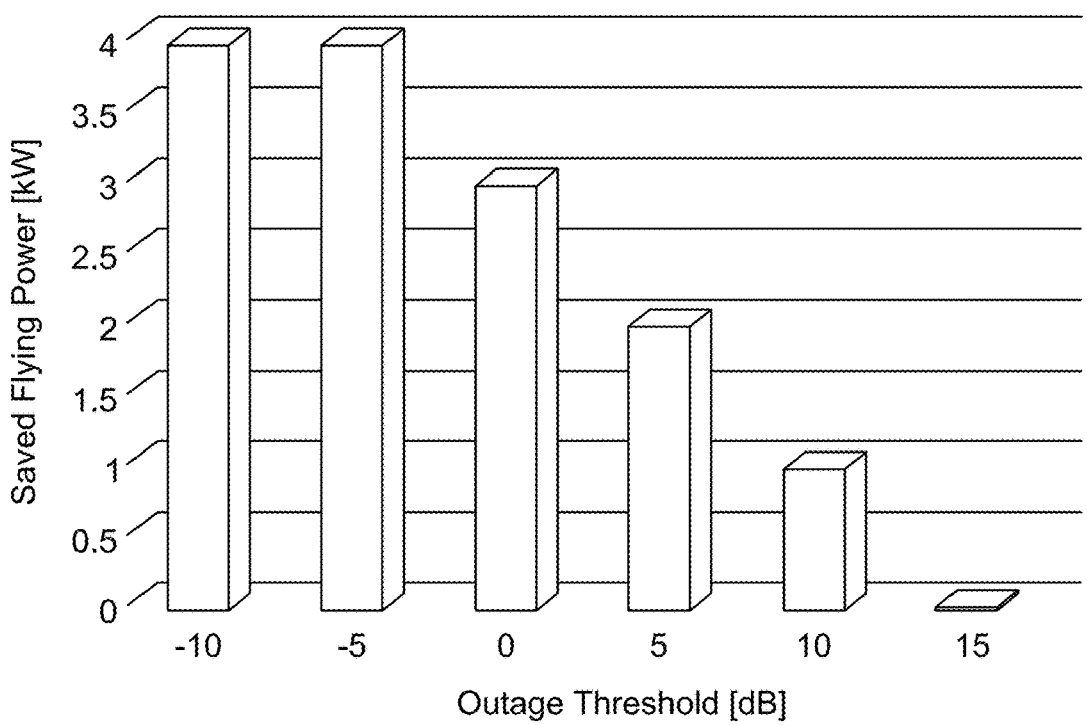
FIG. 7 is a graphical plot showing an amount of saved flying power in an experiment to achieve an outage probability of $1 \times 10^{-3}$ with six available UAVs by using the disclosed relaying protocol in comparison to the all-active and the best UAV relaying protocols, according to aspects of the present disclosure.

FIG. 7 is a graphical plot 700 showing the amount of saved flying power in an experiment to achieve an outage probability (target outage probability) of $1 \times 10^{-3}$ with six available UAVs by using the disclosed relaying protocol in comparison to the all-active and the best UAV relaying protocols, according to aspects of the present disclosure.

In the experiment, a small DJI Spreading Wings S900 UAV model with a power consumption of 1 Kw is used. For the SNR outage threshold of −10 dB, by using the disclosed relaying protocol, four of the six UAVs are kept on the ground, and thus a total flying power of 4 kW is saved. When the SNR outage threshold is increased to −5 dB, the total saved flying power is also 4 kW. When the SNR outage threshold increases to 0 dB, by using the disclosed relaying protocol, three UAVs are flying out of the six UAVs, and three UAVs are still on the ground. As a result, an amount of 3 kW is saved by using the disclosed relaying protocol in comparison to the all-active and the best UAV relaying protocols.

The disclosure describes an effective energy efficient UAV relaying protocol for a limited number of available UAVs. In contrast to the related UAV relaying protocols in literature, in the disclosed UAV relaying protocol, not all the available UAVs are initially activated for fly in the sky to help the source node sending a message to the destination node. Depending on a sum of the SNRs associated with the active UAV(s), if the sum of the SNRs is less than a certain threshold or the system requirement, another UAV is activated to fly in the sky to help the source node sending the message to the destination node; otherwise, there is no need to activate another UAV. This procedure can continue until the system requirement is satisfied or all the available UAVs have been activated for flying in the sky.

According to aspects of the present disclosure, to save the battery life of the UAVs and at the same time to achieve the required system performance, more UAVs may be activated to fly in the sky and to assist the source device 106 to send a message to the destination device 108 only if the already flying UAVs are not enough to satisfy the targeted system performance. The process starts with activating one UAV and continues until all the available UAVs are active and flying in the sky. According to an aspect, more UAVs may be activated to fly in the sky based on a sum of the SNRs associated with the already active or flying UAVs. If the sum of the SNRs associated with the active UAVs is below a certain threshold, then another UAV is activated to assist in forwarding the source message to the destination device 108. Then, it is checked again if the updated sum of SNRs associated with the active UAVs including the newly activated UAV is still unsatisfactory. If the updated sum of SNRs is still unsatisfactory, then another UAV is activated or added to the active set of UAVs. More UAVs are activated or added until required system performance is at least satisfactory, or until the last UAV is available. In an example, UAVs may be used for facilitating secure communication between a base station and a scientific team in a forest or in far areas.

Figure 8:
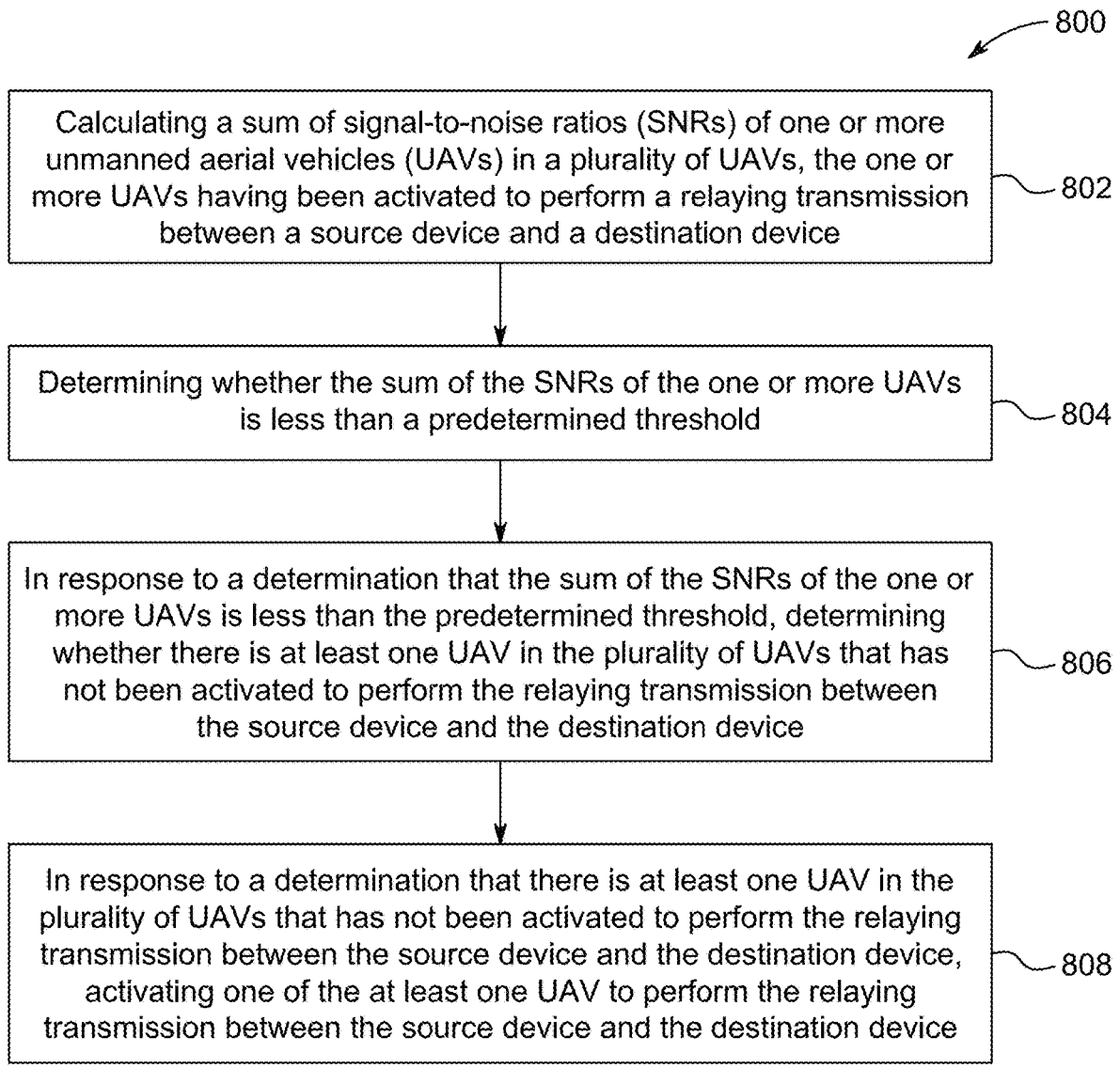
FIG. 8 illustrates a method of relaying a transmission between a source device and a destination device in a wireless communication network where one or more activated UAVs in a plurality of UAVs have been activated to relay the transmission between the source device and the destination device, according to aspects of the present disclosure.

FIG. 8 illustrates a method 800 of relaying a transmission between a source device (e.g., the source device 106) and a destination device (e.g., the destination device 108) in a wireless communication network where one or more activated UAVs in a plurality of UAVs (e.g., the plurality of UAVs 110-(1-K)) have been activated to relay the transmission between the source device and the destination device. In an example, a number of the activated UAVs to achieve a target outage probability may be determined based on a predetermined threshold. Each activated UAV may receive a source message from the source device, decode the source message, and transmit the decoded source message to the destination device. In an example, each of the source device, the destination device, and the plurality of UAVs is equipped with a respective single antenna.

At step 802, the method 800 includes calculating a sum of SNRs associated with the one or more activated UAVs in the plurality of UAVs, the one or more activated UAVs having been activated to relay the transmission between the source device and the destination device. In an example, each of the one or more activated UAVs may receive a source message from the source device, decode the source message, and transmit the decoded source message to the destination device. According to an aspect, the processing circuit 202 may be configured to calculate the sum of SNRs associated with the one or more activated UAVs in the plurality of UAVs.

At step 804, the method 800 includes determining whether the sum of the SNRs associated with the one or more activated UAVs is less than a predetermined threshold. According to an aspect, the processing circuit 202 may be configured to determine whether the sum of the SNRs associated with the one or more activated UAVs is less than the predetermined threshold. In an implementation, the processing circuit 202 may calculate a first channel instantaneous SNR and a second channel instantaneous SNR for each of the one or more activated UAVs, the first channel instantaneous SNR of the respective activated UAV being associated with a channel between the source device and the respective activated UAV, the second channel instantaneous SNR of the respective activated UAV being associated with a channel between the respective activated UAV and the destination device. The processing circuit 202 may further calculate the SNR associated with each of the one or more activated UAVs based on a minimum one between the first channel instantaneous SNR and the second channel instantaneous SNR for the respective activated UAV.

At step 806, the method 800 includes, in response to a determination that the sum of the SNRs associated with the one or more activated UAVs is less than the predetermined threshold, determining whether there is at least one UAV in the plurality of UAVs that has not been activated to relay the transmission between the source device and the destination device. According to an aspect, the processing circuit 202 may be configured to determine whether there is at least one UAV in the plurality of UAVs that has not been activated to relay the transmission between the source device and the destination device in response to the determination that the sum of the SNRs associated with the one or more activated UAVs is less than the predetermined threshold. According to an implementation, in response to a determination that the sum of the SNRs associated with the one or more activated UAVs is not less than the predetermined threshold, the processing circuit 202 may be configured to update the sum of the SNRs associated with the one or more activated UAVs after a predetermined period and to determine whether the updated sum of the SNRs associated with the one or more activated UAVs is less than the predetermined threshold. In an example, the predetermined period may be a symbol duration.

At step 808, the method 800 includes, in response to a determination that there is at least one UAV in the plurality of UAVs that has not been activated to relay the transmission between the source device and the destination device, activating one of the at least one UAV to relay the transmission between the source device and the destination device. According to an aspect, the processing circuit 202 may be configured to activate one of the at least one UAV to relay the transmission between the source device and the destination device in response to the determination that there is at least one UAV in the plurality of UAVs that has not been activated to relay the transmission between the source device and the destination device.

Figure 9:
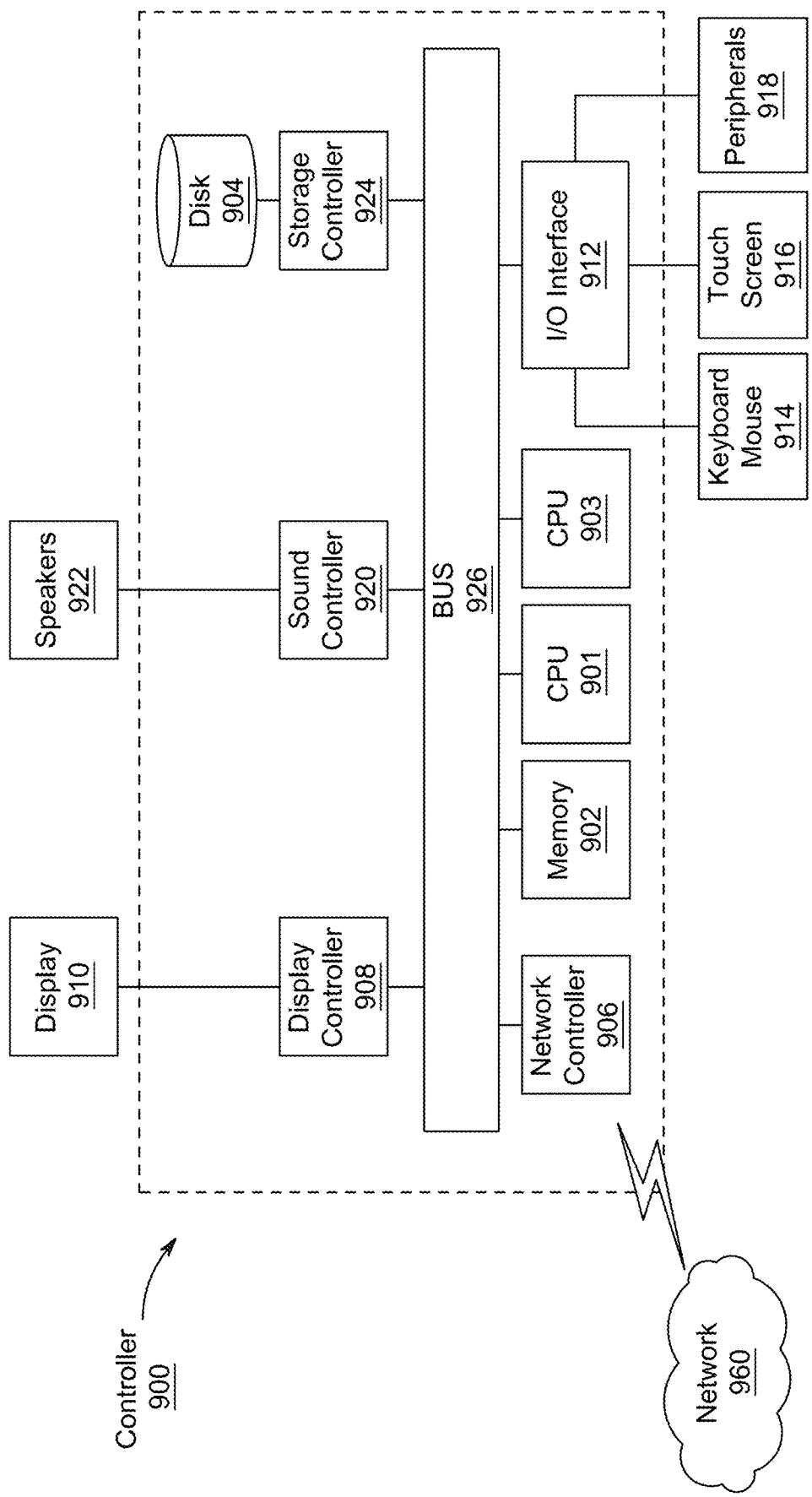
FIG. 9 is an illustration of a non-limiting example of details of computing hardware used in the computing system, according to aspects of the present disclosure.

FIG. 9 is an illustration of a non-limiting example of details of computing hardware used in the computing system, according to exemplary aspects of the present disclosure. In FIG. 9, a controller 900 is described which is a computing device (for example, apparatus 100) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network, such as an LAN or WAN network, or any combination thereof and can also include PSTN or ISDN sub-networks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
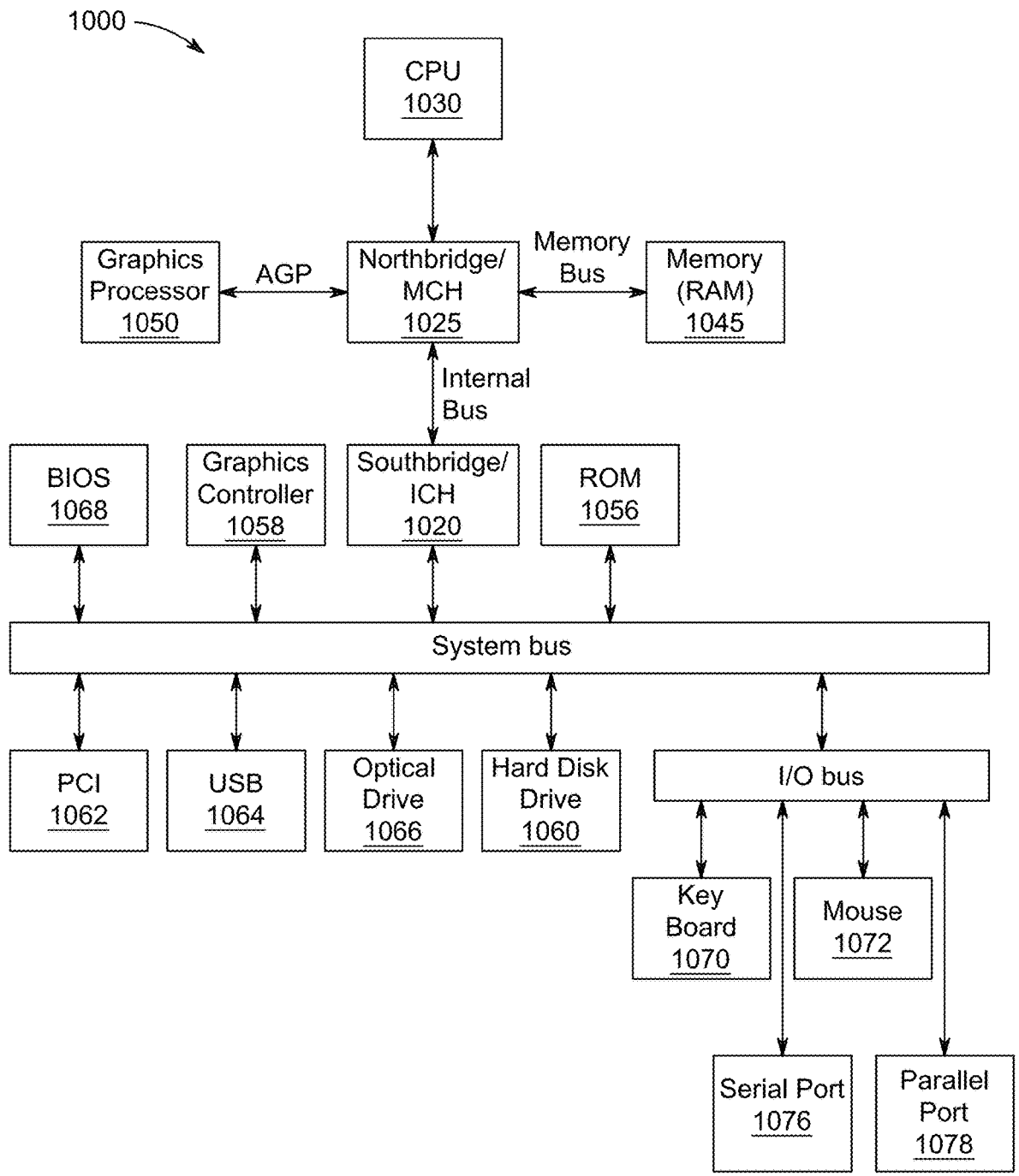
FIG. 10 is an exemplary schematic diagram of a data processing system used within the computing system, according to aspects of the present disclosure.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 2045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
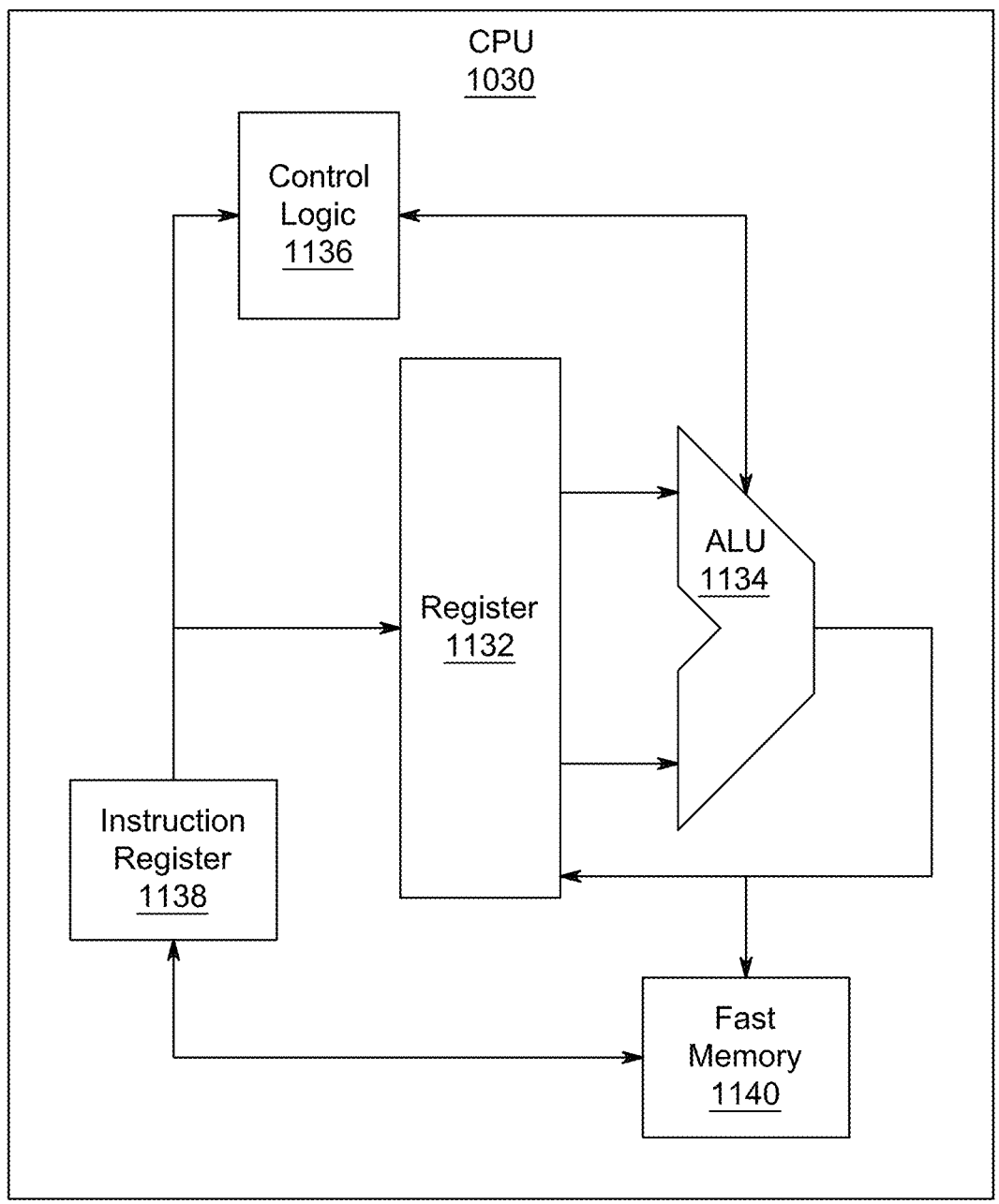
FIG. 11 is an exemplary schematic diagram of a processor used with the computing system, according to aspects of the present disclosure.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
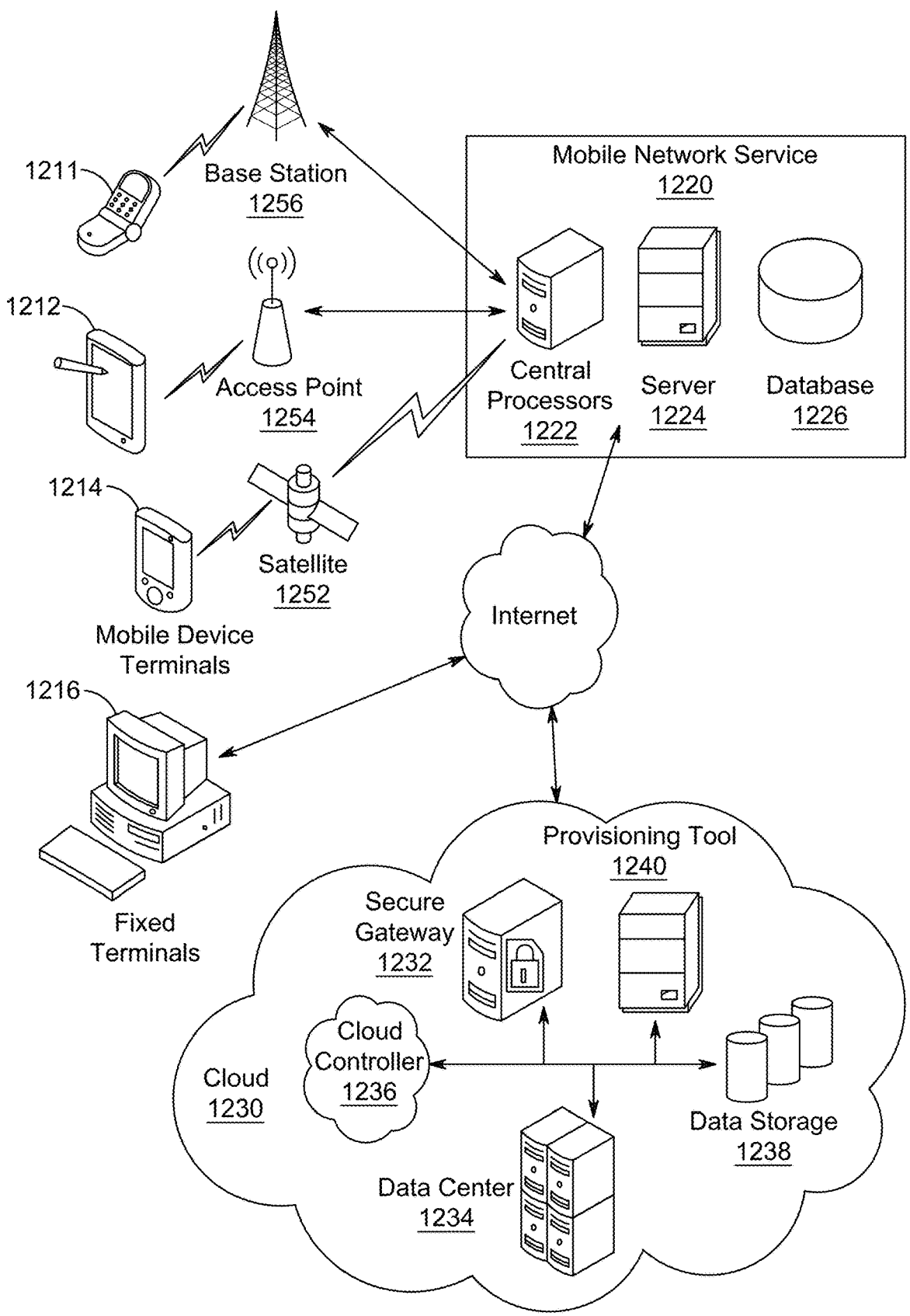
FIG. 12 is an illustration of a non-limiting example of distributed components which may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including a smart phone 1211, a tablet 1212, a mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, a server 1224 and a database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method of relaying a transmission between a source device and a destination device in a wireless communication network where one or more activated unmanned aerial vehicles (UAVs) in a plurality of UAVs have been activated to relay the transmission between the source device and the destination device, the method comprising:

calculating a sum of signal-to-noise ratios (SNRs) associated with the one or more activated UAVs, wherein the calculating comprises calculating a first channel instantaneous SNR and a second channel instantaneous SNR for each of the one or more activated UAVs, the first channel instantaneous SNR for the respective activated UAV being associated with a channel between the source device and the respective activated UAV, the second channel instantaneous SNR for the respective activated UAV being associated with a channel between the respective activated UAV and the destination device;

determining whether the sum of the SNRs associated with the one or more activated UAVs is less than a predetermined threshold;

in response to a determination that the sum of the SNRs associated with the one or more activated UAVs is less than the predetermined threshold, determining whether there is at least one UAV in the plurality of UAVs that has not been activated to relay the transmission between the source device and the destination device; and in response to a determination that there is at least one UAV in the plurality of UAVs that has not been activated to relay the transmission between the source device and the destination device, activating one of the at least one UAV to relay the transmission between the source device and the destination device, wherein each of the one or more activated UAVs receives a source message from the source device, decodes the source message, and transmits the decoded source message to the destination device.

2. The method of claim 1, further comprising:

in response to a determination that the sum of the SNRs associated with the one or more activated UAVs is not less than the predetermined threshold, updating the sum of the SNRs associated with the one or more activated UAVs after a predetermined period; and determining whether the updated sum of the SNRs associated with the one or more activated UAVs is less than the predetermined threshold.

3. The method of claim 1, wherein the calculating further comprises:

calculating the SNR associated with each of the one or more activated UAVs based on a minimum one between the first channel instantaneous SNR and the second channel instantaneous SNR for the respective activated UAV.

4. The method of claim 1, wherein each of the source device, the destination device, and the plurality of UAVs is equipped with a respective single antenna.

5. The method of claim 1, wherein a number of the activated UAVs to achieve a target outage probability is determined based on the predetermined threshold.

6. An apparatus, comprising:

processing circuit configured to calculate a sum of signal-to-noise ratios (SNRs) associated with one or more activated unmanned aerial vehicles (UAVs) in a plurality of UAVs, the one or more activated UAVs having been activated to relay a transmission between a source device and a destination device, including calculating a first channel instantaneous SNR and a second channel instantaneous SNR for each of the one or more activated UAVs, the first channel instantaneous SNR for the respective activated UAV being associated with a channel between the source device and the respective activated UAV, the second channel instantaneous SNR for the respective activated UAV being associated with a channel between the respective activated UAV and the destination device, determine whether the sum of the SNRs associated with the one or more activated UAVs is less than a predetermined threshold, in response to a determination that the sum of the SNRs associated with the one or more activated UAVs is less than the predetermined threshold, determine whether there is at least one UAV in the plurality of UAVs that has not been activated to relay the transmission between the source device and the destination device, and in response to a determination that there is at least one UAV in the plurality of UAVs that has not been activated to relay the transmission between the source device and the destination device, activate one of the at least one UAV to relay the transmission between the source device and the destination device, wherein each of the one or more activated UAVs receives a source message from the source device, decodes the source message, and transmits the decoded source message to the destination device.

7. The apparatus of claim 6, wherein the processing circuitry is further configured to:
in response to a determination that the sum of the SNRs associated with the one or more activated UAVs is not less than the predetermined threshold,
update the sum of the SNRs associated with the one or more activated UAVs after a predetermined period; and
determine whether the updated sum of the SNRs associated with the one or more activated UAVs is less than the predetermined threshold.

8. The apparatus of claim 6, wherein the processing circuitry is further configured to:
calculate the SNR associated with each of the one or more activated UAVs based on a minimum one between the first channel instantaneous SNR and the second channel instantaneous SNR for the respective activated UAV.

9. The apparatus of claim 6, wherein each of the source device, the destination device, and the plurality of UAVs is equipped with a respective single antenna.

10. The apparatus of claim 6, wherein a number of the activated UAVs to achieve a target outage probability is determined based on the predetermined threshold.

11. A non-transitory computer-readable storage medium storing a program executable by at least one processor to perform:
calculating a sum of signal-to-noise ratios (SNRs) associated with one or more activated unmanned aerial vehicles (UAVs) in a plurality of UAVs, the one or more activated UAVs having been activated to relay a transmission between a source device and a destination device, including calculating a first channel instantaneous SNR and a second channel instantaneous SNR for each of the one or more activated UAVs, the first channel instantaneous SNR for the respective activated UAV being associated with a channel between the source device and the respective activated UAV, the second channel instantaneous SNR for the respective activated UAV being associated with a channel between the respective activated UAV and the destination device;

determining whether the sum of the SNRs associated with the one or more activated UAVs is less than a predetermined threshold;

in response to a determination that the sum of the SNRs associated with the one or more activated UAVs is less than the predetermined threshold, determining whether there is at least one UAV in the plurality of UAVs that has not been activated to relay the transmission between the source device and the destination device; and in response to a determination that there is at least one UAV in the plurality of UAVs that has not been activated to relay the transmission between the source device and the destination device, activating one of the at least one UAV to relay the transmission between the source device and the destination device, wherein each of the one or more activated UAVs receives a source message from the source device, decodes the source message, and transmits the decoded source message to the destination device.

12. The non-transitory computer-readable storage medium of claim 11, wherein the stored program executable by the at least one processor is further to perform:
in response to a determination that the sum of the SNRs associated with the one or more activated UAVs is not less than the predetermined threshold,
updating the sum of the SNRs associated with the one or more activated UAVs after a predetermined period; and
determining whether the updated sum of the SNRs associated with the one or more activated UAVs is less than the predetermined threshold.

13. The non-transitory computer-readable storage medium of claim 11, wherein the stored program executable by the at least one processor is further to perform:
calculating the SNR associated with each of the one or more activated UAVs based on a minimum one between the first channel instantaneous SNR and the second channel instantaneous SNR for the respective activated UAV.

14. The non-transitory computer-readable storage medium of claim 11, wherein each of the source device, the destination device, and the plurality of UAVs is equipped with a respective single antenna.

* * * * *